United States Patent [19]

Schultz et al.

[11] Patent Number: 4,951,925
[45] Date of Patent: Aug. 28, 1990

[54] FENCE CONNECTOR ASSEMBLY

[75] Inventors: David H. Schultz, Grand Haven; Steven W. Mattson, Muskegon; Donald E. Heinz, West Olive, all of Mich.

[73] Assignee: Alternate Number Thirteen, Grand Haven, Mich.

[21] Appl. No.: 149,691

[22] Filed: Jan. 28, 1988

[51] Int. Cl.⁵ ............................................. E04H 17/14
[52] U.S. Cl. ...................................... 256/65; 256/22; 403/191; 403/245
[58] Field of Search ...................... 256/65, 67, 66, 59, 256/22, 21, 68, 69, 26; 403/49, 191, 245, 246, 262, 264, 231

[56] References Cited

U.S. PATENT DOCUMENTS

| | | |
|---|---|---|
| 101,825 | 4/1870 | Clinger . |
| 437,592 | 9/1890 | Goetz . |
| 444,681 | 1/1891 | Windus . |
| 716,898 | 12/1902 | Hutchings . |
| 725,527 | 4/1903 | Whitehurst . |
| 949,394 | 2/1910 | Daly . |
| 1,791,680 | 2/1931 | Miller ............................ 256/22 X |
| 2,037,736 | 4/1936 | Payne et al. . |
| 2,113,196 | 4/1938 | Jones . |
| 2,118,467 | 5/1938 | Jones . |
| 2,944,797 | 7/1960 | Magness ............................. 256/21 |
| 3,031,217 | 4/1962 | Tinnerman . |
| 3,136,530 | 6/1964 | Case ............................. 256/65 X |
| 3,195,937 | 2/1965 | Case ............................. 256/65 X |
| 3,304,683 | 2/1967 | Ferreira . |
| 3,343,811 | 9/1967 | Kusel et al. ........................... 256/22 |
| 3,471,182 | 10/1969 | Schroer ............................. 256/21 X |
| 3,499,631 | 3/1970 | Heldenbrand ..................... 256/59 X |
| 3,752,262 | 8/1973 | Helms . |
| 3,942,763 | 3/1976 | Helterbrand et al. ................ 256/22 |
| 3,946,992 | 3/1976 | Elias ....................................... 256/68 |
| 3,993,289 | 11/1976 | Lewis et al. ........................... 256/59 |
| 4,073,478 | 2/1978 | Bermudez ............................. 256/24 |
| 4,074,893 | 2/1978 | Coltrin ................................... 256/21 |
| 4,101,226 | 7/1978 | Parisien . |
| 4,599,010 | 7/1986 | Hocking .......................... 403/49 X |
| 4,600,179 | 7/1986 | Willetts ................................. 256/67 |
| 4,623,126 | 11/1986 | Petti . |
| 4,723,760 | 2/1988 | O'Sullivan ....................... 256/65 X |

FOREIGN PATENT DOCUMENTS 3404947 8/1985 Fed. Rep. of Germany .

Primary Examiner—Peter M. Cuomo
Attorney, Agent, or Firm—Price Heneveld

[57] ABSTRACT

A fence and connector assembly having connector brackets mounted near the top and bottom of the fence posts, each bracket having a vertical sleeve and side flange members spaced to receive the ends of rails therebetween, and L-shaped bracket securing and rail mounting studs between the flange members. The rails have limited pivotal movement on the distal ends of these studs to accommodate uneven terrain, and are secured thereon by spring retainers within the rails. Between the vertically spaced, generally horizontal rails are vertical rungs, each having its lower end in aperture in the lower hollow rail and its upper end in an aperture into the upper hollow rail. Locking rods extend through the rails and through these transverse apertures adjacent the ends of the rungs, securing the rungs to the rails.

12 Claims, 3 Drawing Sheets

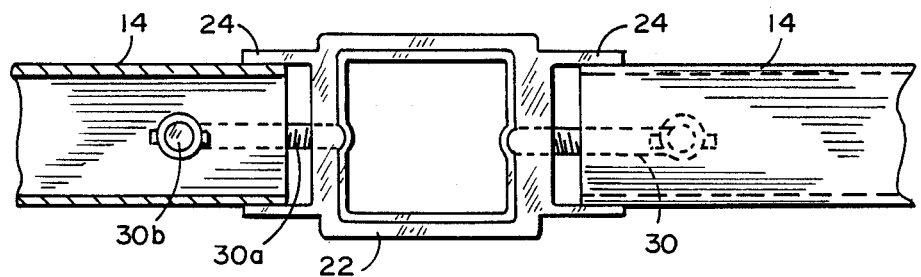
FIG. 3
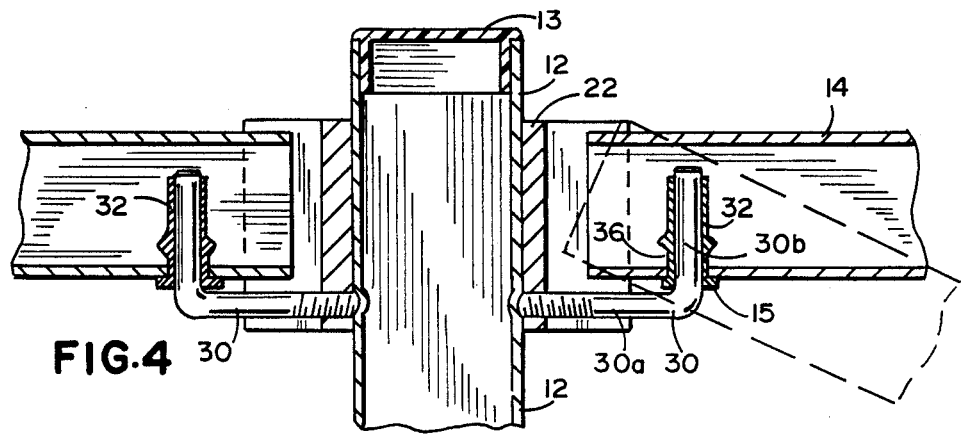
FIG. 4
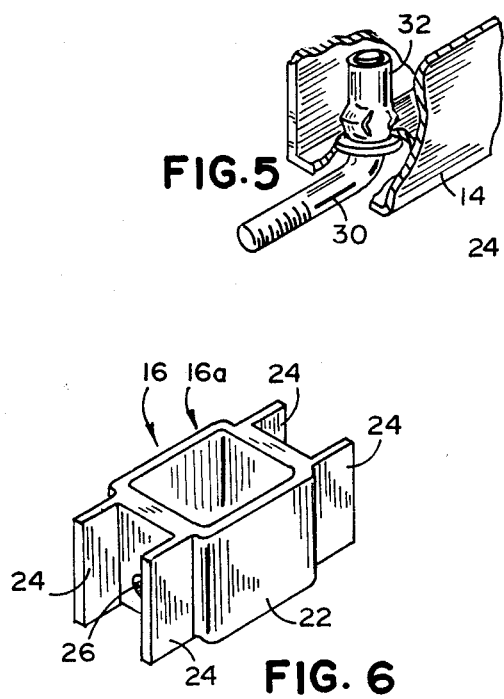
FIG. 5
FIG. 6
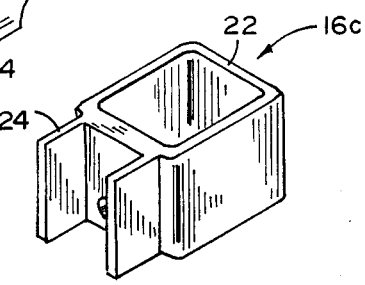
FIG. 8
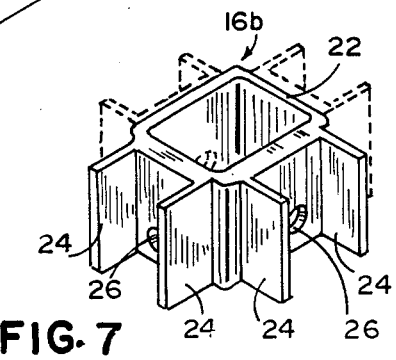
FIG. 7

FENCE CONNECTOR ASSEMBLY

BACKGROUND OF THE INVENTION

This invention relates to fencing, and more particularly to a fence assembly for connecting fence rails to fence posts and fence rungs to fence rails One common technique for mounting metal fencing is to anchor sockets to the ground, insert posts into the sockets, and placing caps on the tops of the posts. Typically, the formation of a fence requires labor intensive assembly as well as the use of multiple tools. Connection of the rails to the posts is tedious and time consuming, as is the interconnection of successive rungs to the rails Moreover, construction on uneven terrain is often particularly complex, even requiring a customized structure and special skills.

Various scaffolding and wall structures have been proposed heretofore including collars or brackets having a horizontal support surface for supporting a horizontal member. Extending upwardly from the support surface is a locating stud for reception in the horizontal member. Separate set screws are required to lock the collar or bracket in position on the vertical post. The studs may be formed integrally with the collars or brackets, or can be secured by means of welding or the like. For further information concerning the structure and operation of such scaffolding, reference may be made to U.S. Pat. Nos. 2,113,196, 2,118,467 and 3,304,683.

SUMMARY OF THE INVENTION

An object of this invention is to provide a fence and connector assembly capable of quick, easy interconnection to result in a secure arrangement and capable of accommodation to uneven terrain or flat terrain as encountered by the installers. The fencing can be employed readily to enclose a yard or larger space, or around a swimming pool or the like. No special skill or craft is required of the installers. The connectors are attached to the posts by tightening threaded L-shaped studs, the fence rails then being attached to the connectors by securing the rails on distal ends of the special studs. Spring retainers secure the rails to the studs.

The connected assembly has sufficient pivotal movement at the ends of the rails to allow vertical accommodation to uneven terrain so that a customized fence need not be built for such locations.

Assembly of rungs to the rails is achieved by locking bars so that the rail and rung assembly can be put together while lying on the ground, rather than each rung being attached one at a time in a vertical orientation in a time consuming, costly fashion, as is conventional. Locking rods secure all of the rungs to the rails, with the connected rungs and rails then being lifted into position as a unit for easy connection to the novel connector brackets on the posts.

These and other objects, advantages and features of the invention will become apparent upon studying the following specification in conjunction with the drawings.

BRIEF DESCRIPTION OF THE DRAWINGS

FIG. 3 is an enlarged plan view of a fence post, connector bracket and rails hereof;

FIG. 4 is an enlarged fragmentary sectional view of the assembly in FIG. 3;

FIG. 5 is an enlarged fragmentary perspective sectional view of the end of one of the rails in FIGS. 3 and 4;

FIG. 6 is a perspective view of one of the connectors having connection flanges on opposite sides of the sleeve;

FIG. 7 is a perspective view of a modified connector bracket having the connector flanges on adjacent sides of the sleeve and showing in phantom flanges on the other two sides;

FIG. 8 is a perspective view of an end bracket having connector flanges on only one side of the sleeve;

DESCRIPTION OF THE PREFERRED EMBODIMENT

Figure 1:
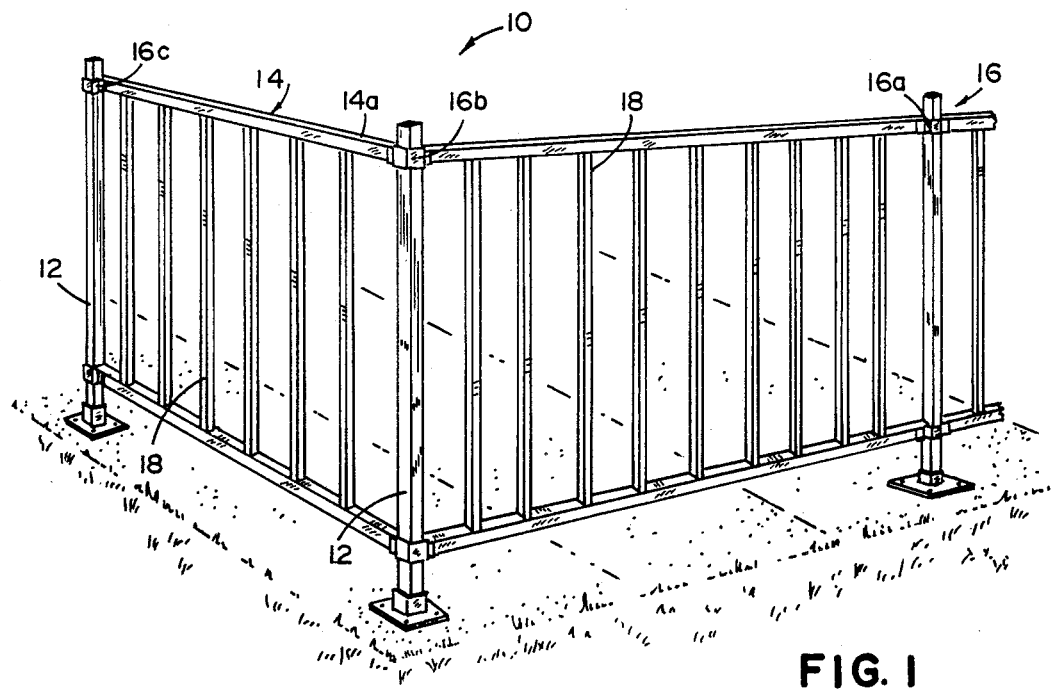
FIG. 1 is a fragmentary, perspective view of a section of fence formed according to this invention.
Figure 2:
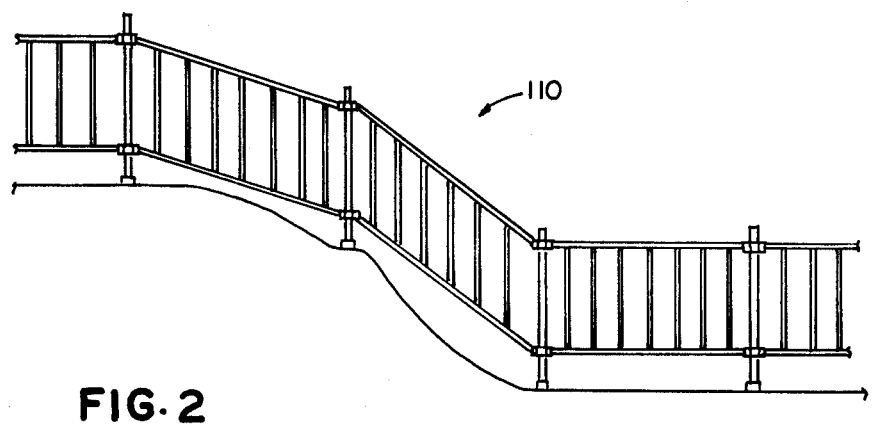
FIG. 2 is a section of the novel fence showing uneven terrain accommodation.

Referring now to the drawings, a fence assembly such as that depicted at 10 in FIG. 1 or 110 in FIG. 2 is readily made by assembly of the components of this invention. These components include a plurality of substantially vertical posts 12, generally horizontal upper and lower rails 14a and 14b, connector brackets 16 and vertical rungs 18. While a particular configuration is depicted with vertical rungs 18 extending the entire distance between two rails, it is conceivable that a particular fence could employ three or more vertically spaced rails rather than two, could have rung extensions projecting vertically up from the top rail, or other variations for a variety of styles as desired. The novel connector brackets enable variations to be readily made without changing the basic nature of the components except for dimensions.

Vertical posts 12 are shown to be tubular in construction, depicted here as rectangular in cross section. The hollow posts are shown in the preferred embodiment to have a wall which is slightly flexible to be deformable by the stud for secure assembly of the bracket to the post as described hereinafter. Alternate detent facility may be provided in lieu of the slightly deformable wall. The posts may be of tubular galvanized steel construction, preferably having a protective coating thereon. Alternatively, the posts may be of aluminum or the like, as with an anodized surface for weather protection and decorative appeal.

The elongated generally horizontal rails 14a and 14b likewise are hollow and depicted here to be of generally rectangular cross sectional configuration. These may be formed of suitable materials such as tubular galvanized steel having a protective coating thereon, or alternatively of aluminum such as one having an anodized decorative surface.

The individual rungs 18 may be of the same material as the posts and/or rails, and may be solid or tubular, of desired cross sectional configuration. These are interconnected with the rails in a manner to be described hereinafter.

Most of the connector brackets 16 are of the construction depicted in FIG. 6 at 16a for coplanar connection of the rails. Connector 16b in FIG. 7 serves as a corner post connector. Connector 16c in FIG. 8 serves as an end post connector. If fencing is to extend in three or four directions from the post, the connector may conceivably be of a type (not shown) including additional pairs of flanges from the other face or faces.

Referring now specifically to FIG. 6, the connector bracket 16a there depicted includes a hollow, vertical, post-receiving sleeve 22, open on its upper and lower ends to slide over a post. It has an internal configuration matching that of the post, here shown to be rectangular with four sidewalls. Extending from two opposite sidewalls of this sleeve are two integral pairs of generally vertically oriented, laterally extending flange members 24. The parallel flange members of each pair are spaced apart sufficiently to receive therebetween the end of a rail 14a or 14b. These flanges also straddle a threaded orifice 26 through the adjacent wall of sleeve 22.

Corner connector bracket 16b depicted in FIG. 7 has integral flanges 24 projecting from adjacent walls of sleeve 22, enabling connected rails to project from each other at an angle less than 180 degrees, here shown to be at 90 degrees. In this bracket also, the flange members straddle threaded orifices 26. To complete the assembly, a certain number of connector brackets in FIG. 8 are made to accommodate end posts. Here sleeve 22 has flange members 24 integrally extending from only one wall of the sleeve.

Cooperative with each threaded aperture 26 is an L-shaped stud 30 having a threaded horizontal leg 30a projecting from the post and a vertical leg 30b forming a free distal end oriented upwardly when the stud is fully assembled with the threaded aperture (FIG. 4). This stud is received by an opening in the rail.

Specifically, opening 15 as in rail 14a (FIG. 4) is substantially larger than the diameter of distal end 30b of stud 30 to receive it while allowing limited vertical rail movement Within this opening and extending around the distal end of the stud is a retention member in the form of a spring clip 32. This spring clip has a neck lining the opening, a lower flange 34 outside the bottom wall of the rail and a pair of tangs 36 inside the bottom wall of the rail to hold the spring clip in place, and upper stud gripping portions. The spring clip may be of a conventional type of the "Tinnermann" brand made by Eaton Corporation. Alternative spring clips to the one depicted may be employed. Opening 15 in the rail is spaced from the adjacent end of the rail a smaller amount than the distal end or leg 30b of stud 30 is spaced from sleeve 22, to leave a space S between the end of the rail and the sleeve. Rail 14 then can be moved vertically about the stud through an arc (such as is depicted in phantom lines in FIG. 4), without binding on the bracket, to enable the fence to accommodate uneven terrain as will be understood from review of the entire disclosure.

Figure 9:
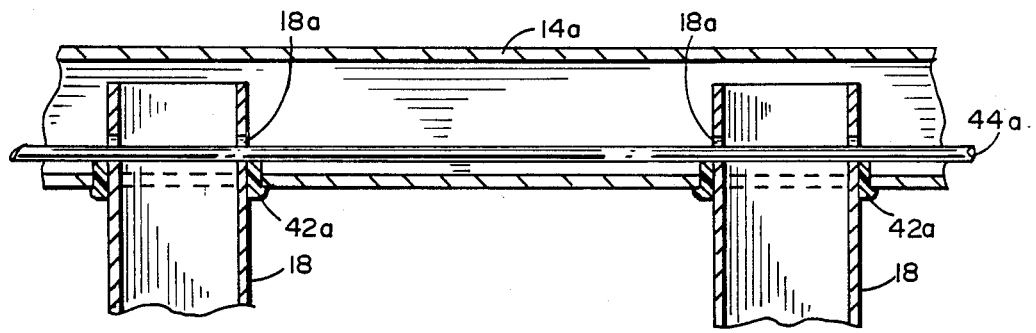
FIG. 9 is an enlarged fragmentary sectional elevational view of a top rail and rung and locking bar subassembly.
Figure 10:
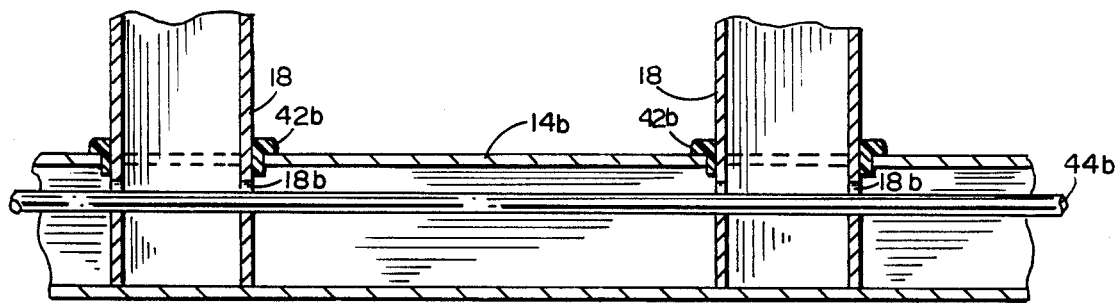
FIG. 10 is an enlarged fragmentary sectional elevational view of the bottom rail, a portion of a rung and a locking rod subassembly.
Figure 11:
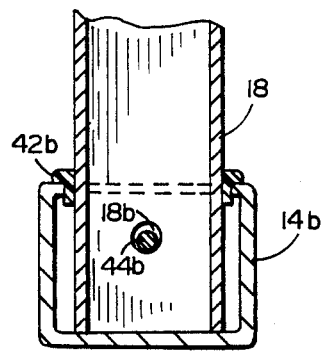
FIG. 11 is a fragmentary sectional end view of the subassembly in FIG. 10.

Assembly of rungs 18 to the upper and lower rails 14a and 14b is preferably as depicted in FIGS. 9 and 10. The bottom wall of upper rail 14a has a plurality of spaced openings 40a along its length, while lower rail 14b has a like plurality of spaced openings 40b in its upper wall along its length. These openings preferably have a flexible grommet 42a and 42b therein, and receive the respective upper and lower ends of rungs 18. The received end portions of rungs 18 have transverse apertures 18a and 18b therethrough, these apertures being located within the hollow confines of rails 14a and 14b as depicted. Extending through each rail is a locking rod, i.e. rods 44a and 44b respectively, which also extend through rung apertures 18a and 18b respectively, to secure the assembly together. Apertures 18a and 18b are substantially larger in diameter than the diameter of locking rods 44a and 44b to allow easy assembly thereof, to provide a certain amount of parallelogram flexibility to the construction for accommodating uneven terrain, and to provide limited vertical movement, for example, if someone were to stand on the lower rail.

Assembly of the novel construction is rapid and relatively simple. Posts 12 are first mounted as by burial in the ground, anchoring in concrete or bolting to a solid surface, in conventional fashion. Connector brackets 16 are then slid down over the post, with L-shaped stud members 30 being threaded through openings 26 into engagement with the deformable walls of the post. Once tightened, these studs are forcefully rotated until the free distal end 30b is in a vertical orientation upwardly, the indentable post wall allowing this final adjustment (FIGS. 3 and 4), with the indentations and the stress thereon lending to a secure attachment.

Rungs 18 are assembled to rails 14, preferably while these elements are simply lying on the ground. The rungs are inserted into the apertures or openings of the rails, and rotationally oriented to enable the locking rods to be inserted endwise through the hollow rails and through the respective transverse apertures of the rungs to connect these components together. The rungs and rails are then lifted from the ground as a unit and moved to the posts where the rails are placed vertically down between guiding and protective flanges 24 and mounted on studs 30 received within rail apertures 15 and spring clips 32. These spring clips retain the rails in position, allowing removal only by forceful action. If the terrain is uneven, rails 14 will project at an angle to the substantially vertical posts, but still generally horizontal (See FIG. 2). The flexible interconnection of the rails to the studs and of the rungs to the rails enables ready accommodation of each section to the terrain.

Each post can have a suitable top cap or plug 13 (FIG. 4) as of plastic or the like friction fit into place to prevent rain entry and provide a finished appearance.

Various additional advantages and features of the invention disclosed in its preferred embodiment will be apparent to those studying this disclosure. It is not intended that the invention is to be limited to the specific preferred embodiment depicted as illustrative, but only by the scope of the appended claims and the reasonable equivalents thereto.

The embodiments of the invention in which an exclusive property or privilege is claimed are defined as follows.

1. A connector assembly for joining or at least one generally horizontal rail having two ends, to a substantially vertical post in the formation of fencing, comprising:
    a connector bracket having a vertical sleeve defining a vertical cavity for receiving a post;
    said sleeve having at least one pair of laterally spaced side members projecting from at least one side of said sleeve, said members being substantially parallel to each other and spaced apart sufficient to receive therebetween one end of at least one rail;
    a threaded aperture through said sleeve;
    said side members being astraddle said aperture;

at least one L-shaped mounting stud having a substantially horizontal leg and a substantially vertical leg, said horizontal leg being in threaded engagement with said aperture for securing said connector bracket to the post, and said vertical leg having a distal end spaced from said bracket sleeve;

at least one generally horizontal rail having a vertical opening spaced from the end of said rail, said opening being larger than said distal end of said stud to fit freely thereover, and being spaced from said end of said rail an amount less than the spacing of said distal end from said bracket sleeve to allow said rail to have limited vertical pivotal movement in an arc on said vertical stud leg and between said side members; and a spring retainer at said opening of said rail securing said rail on said mounting stud vertical leg while allowing said limited vertical pivotal movement to accommodate uneven terrain.

2. The connector assembly in claim 1 wherein said bracket has two L-shaped mounting studs on different sides thereof and two pairs of side members, each pair straddling one of said mounting studs.

3. The connector assembly of claim 2 wherein said sleeve and said side members comprise an integral extrusion.

4. The connector assembly in claim 1 wherein said rail has a hollow end, said spring retainer is in said rail hollow end and engages said vertical leg of said mounting stud inside said hollow end.

5. The connector assembly of claim 1 wherein said side members are flanges, said bracket has two pairs of said flanges for connecting to two rails, and said bracket sleeve and flanges together comprise an integral extrusion.

6. The connector assembly of claim 5 wherein said integral extrusion is of aluminum.

7. The connector assembly of claim 5 including two rails connected to said bracket by being mounted on respective ones of said mounting studs, each rail having a spring retainer.

8. The connector assembly in claim 7 wherein said stud engages an indent in said post for securement thereto.

9. The connector assembly in claim 1 including two vertically spaced connector brackets, one near the top and one near the bottom of the post, and a pair of upper rails and a pair of lower rails connected to the respective brackets.

10. The connector assembly in claim 9 wherein each bracket has two pair of side flange members for connection to the respective ones of said two rails.

11. The connector assembly in claim 9 wherein each upper rail has a plurality of spaced openings in the bottom thereof to receive the upper ends of a plurality of rungs, and each lower rail has a plurality of spaced openings in the top thereof to receive the lower ends of the plurality of rungs;

a plurality of spaced rungs, each having upper and lower ends, said upper ends inserted in said openings of said rails and said lower ends inserted in said spaced openings in said bottom rails, said ends of said rungs within said rails having transverse apertures therethrough; and locking rods inserted in said rails and through said rung apertures to secure said rails and rungs together.

12. The connector assembly in claim 11 wherein said rung apertures are substantially greater in size than the diameter of said locking rods.

* * * * *